March 17, 1925.

G. GALBRAITH

CONE MAKING MACHINE

Filed July 31, 1922

INVENTOR.
George Galbraith.
BY Davis & Simms
his ATTORNEYS.

March 17, 1925.

G. GALBRAITH

CONE MAKING MACHINE

Filed July 31, 1922 9 Sheets-Sheet 2

INVENTOR.
George Galbraith.
BY Davis & Timms
his ATTORNEYS.

March 17, 1925.

G. GALBRAITH

CONE MAKING MACHINE

Filed July 31, 1922

INVENTOR.
George Galbraith.
BY
his ATTORNEYS.

March 17. 1925.  1,529,882

G. GALBRAITH

CONE MAKING MACHINE

Filed July 31, 1922  9 Sheets-Sheet 4

INVENTOR.
George Galbraith.
BY
his ATTORNEYS.

March 17, 1925. 1,529,882

G. GALBRAITH

CONE MAKING MACHINE

Filed July 31, 1922   9 Sheets-Sheet 6

INVENTOR.
George Galbraith
BY
his ATTORNEYS.

March 17, 1925.　　　　G. GALBRAITH　　　　1,529,882

CONE MAKING MACHINE

Filed July 31, 1922　　　　9 Sheets-Sheet 7

INVENTOR.
George Galbraith.
BY Davis & Simms
his ATTORNEYS.

March 17. 1925.

G. GALBRAITH

CONE MAKING MACHINE

Filed July 31, 1922    9 Sheets-Sheet 9

INVENTOR.
George Galbraith.
BY Davis & Jmins
his ATTORNEYS.

Patented Mar. 17, 1925.

1,529,882

UNITED STATES PATENT OFFICE.

GEORGE GALBRAITH, OF ROCHESTER, NEW YORK.

CONE-MAKING MACHINE.

Application filed July 31, 1922. Serial No. 578,561.

*To all whom it may concern:*

Be it known that I, GEORGE GALBRAITH, a citizen of the United States, and resident of Rochester, in the county of Monroe and State of New York, have invented certain new and useful Improvements in Cone-Making Machines, of which the following is a specification.

The present invention relates to baking machines and more particularly to the type in which two mold elements are provided, one preferably in the form of a mold and the other in the form of a core fitted in said mold. An object of this invention is to provide a core with means such as a depression with which the baked article engages to be withdrawn from the mold when the core is withdrawn from such mold. Another object of the invention is to provide a mold element having porous walls through which a lubricant is passed to oil the mold element. Still another object of the invention is to provide for heating a mold element with a liquid. Another object of the invention is to provide two boxes each with a mold element heated by a liquid in the boxes and each box having a separate heating means. Another and still further object of the invention is to provide a baking machine having a core box and a mold box separable from the core box, with means of novel construction for locking the two boxes together, such means preferably being operated by the means which disconnects the mold box from the core box. Still another object of the invention is to provide an improved mechanism for moving a series of mold boxes toward and from a series of core boxes to permit the mold boxes to be refilled and the baked articles to be removed from the core boxes. Still another and further object of the invention is to provide a machine in which the core boxes move in an endless path and the mold boxes are carried to said core boxes to interlock therewith, travel with the core boxes during the baking and after the baking are disconnected from the core boxes and moved away from the line of core boxes to permit the recharging of the mold boxes, the stripping of the baked articles from the cores and the cleaning of said core and mold boxes before the recharging of the mold boxes and after the baking articles have been stripped from the core boxes. Another object of the invention is to provide an improved means for charging the mold boxes of a baking machine. Still another and further object of the invention is to provide for trimming the baked articles and stripping them from the cores. A further object of the invention is to provide for brushing the mold boxes and the cores of crumbs or particles of the baked material after the baking operation.

To these and other ends, the invention consists of certain parts and combinations of parts, all of which will be hereinafter described: the novel features being pointed out in the appended claims.

The embodiment of the invention herein illustrated is designed for baking cones, now commonly employed as containers for ice cream, but it will be understood that the invention is not limited to the baking of such articles, as features of this machine may be used in machines for baking various articles. In the illustrated embodiment of the invention, the material is baked in a mold element or mold 1, which, in this instance, is formed so as to give the external shape to the article, such as a cone indicated at 2, to be baked. In order to give this article a hollow formation, there may be employed in connection with the mold 1, a mold element or a core 3, which fits within the mold 1 and gives to the article 2 its internal shape. It is preferred that when the core 3 is removed from the mold 1, it will also remove from the mold the article 2 and to this end the core 3 preferably has near its lower portion, annular grooves or depressions 4 into which the material to be baked enters, so that after the baking, a connection will be provided between the core 3 and the article 2, which will cause the article 2 to be withdrawn from the mold 1.

With the end in view of producing the baked article on a large scale, a plurality of the molds 1 are arranged in a group or series upon each of a plurality of mold boxes. In this instance, each series or group is of annular formation, the box preferably being formed by a bottom wall 5 formed with a circular opening 6 and a side wall 7 projecting upwardly from such bottom wall 5. A top wall 8 closes the box and has an annular series of openings 9 formed with internal shoulders 10 on which external shoulders 11 on the molds 1 rest, the molds projecting from the top into the box 7. The top also carries a depending hollow circular portion 12, the lower end of which rests on the bottom 5 about the opening 6 and has a socket 13 formed therein about the circular opening through said portion 12.

Within each mold box 7 an oil preferably an edible oil such for instance as cocoanut oil, may be contained, this oil surrounding the molds 1. Two functions are obtained by the use of this oil, one, lubrication and the other heating. The first function is obtained by making the molds 1 of porous material, preferably aluminum. Through the pores of this material the lubricant seeps and maintains the inner wall of the mold in a lubricated condition. The function of heating the mold is obtained by heating the oil which communicates its heat to the mold. This heating may be obtained in any suitable manner, in this instance, a heating coil 14 is passed about the circular tubular portion 12, being insulated therefrom at 15, the coil being connected at two terminals 16 having spring pressed contacts 17 connected thereto, and operating in and insulated from the top plate 8 of the mold box.

Figures 16, 17, 18, 19, 20, 21:
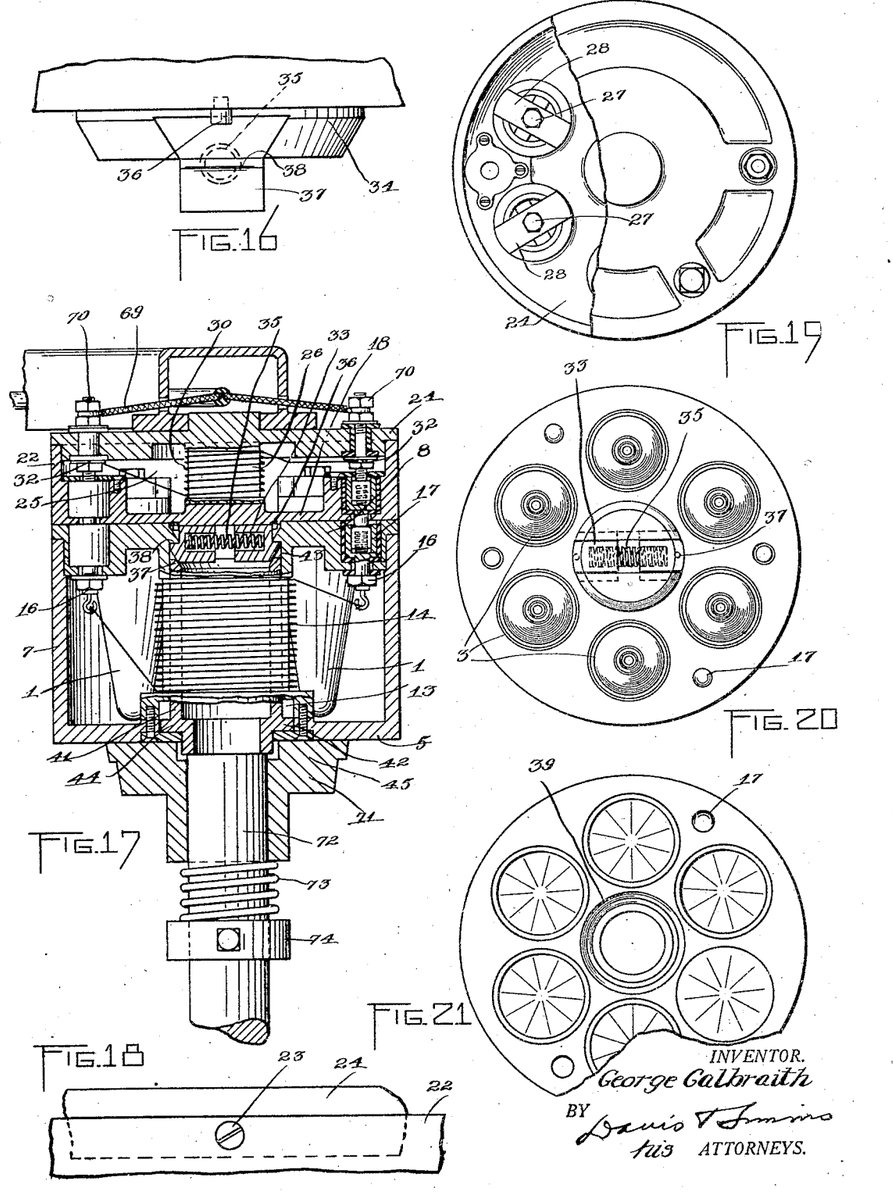
Fig. 16 is a detail view of the core box showing the locking devices.
Fig. 17 is a sectional view through one of the mold boxes and one of the core boxes, while they are connected, the parts being in the positions they occupy just prior to the disconnection of the two boxes.
Fig. 18 is a detail view showing the manner in which the two parts of a core box are secured together.
Fig. 19 is a fragmentary top view of the core box.
Fig. 20 is a view of the under side of the core box.
Fig. 21 is a view of the top of a mold box.
Figure 22:
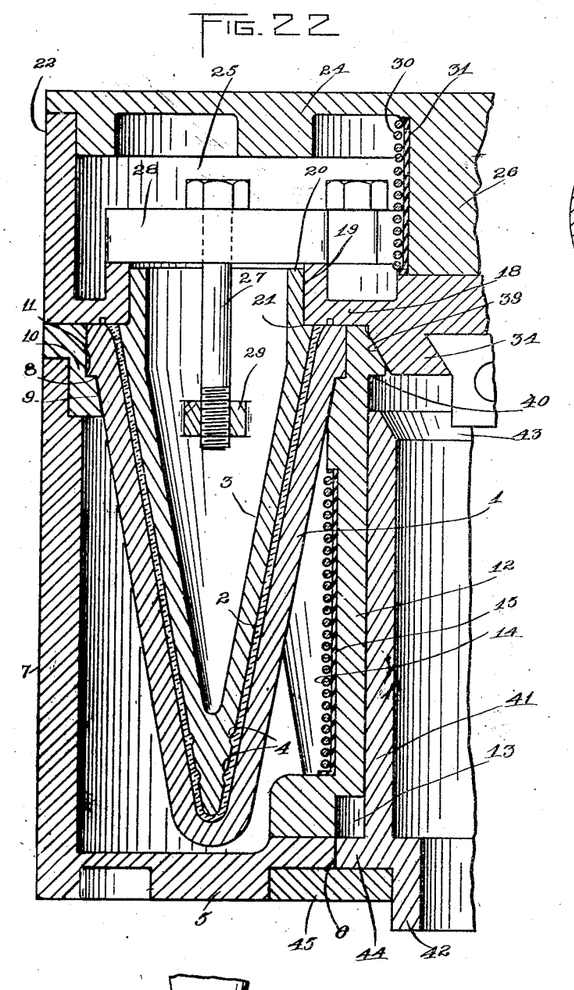
Fig. 22 is an enlarged section through a mold and a core box.
Figure 23:
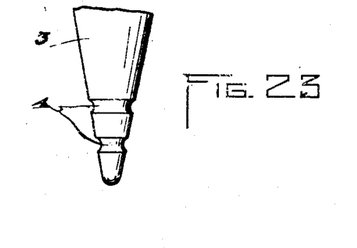
Fig. 23 is a detail view of the lower end of one of the cores.
Figure 24:
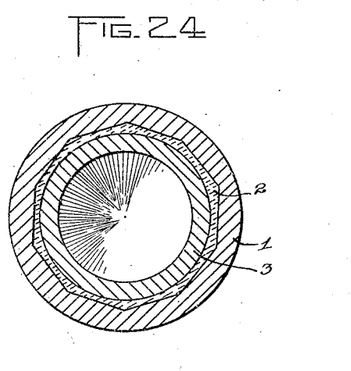
Fig. 24 is a horizontal section through one of the molds and one of the cores while they are in cooperation.
Figure 25:
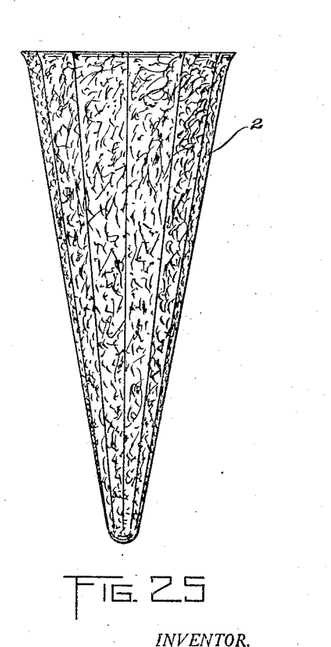
Fig. 25 shows one of the cones or baked articles in side elevation.

The cores 3 are also supported on boxes in annular series arranged so as to cooperate with the molds 1. These core boxes embody each a bottom piece 18 formed with openings 19 through which reduced ends 20 on the cores 3 project, there being provided at the base of the reduced ends, shoulders 21 for cooperating with the under face of the bottom plate 18. An annular side wall 22 projects upwardly from the bottom and is secured by screws 23 (Fig. 18) to a top member 24 thereby forming between them a chamber 25, the top member having a circular depending projection 26 abutting at its lower end the bottom wall 19. The cores may be held to the core boxes, each preferably through a bolt 27 which at its upper end passes through a cross piece 28 bridging an opening in the bottom wall (see Figs. 19 and 22), the lower end of the bolt being anchored in the cross piece 29 secured in a core 3, which is of hollow formation and communicates at its upper end with the chamber 25.

The heating and lubrication of the cores 3 may, like the molds, be effected through an edible oil, such as cocoanut oil, contained in the chamber 25 and in the cores 3, the cores being made of porous metal such as aluminum, the oil being heated in any suitable manner as by a heating coil 30 surrounding the circular projecting portion by insulation 31. This coil (see Figs. 17 and 22) connects with terminals 32 operating in and insulated from the bottom plate 18 of the core box to cooperate with the plungers of the terminals in a mold box.

With the end in view of locking a mold box to a core box, interlocking connection between said parts is provided. In this instance, the core box has two detents 33 arranged to project from the under side thereof (see Figs. 16, 17 and 22), these detents being guided on a tapered centering projection 34 extending centrally from the bottom plate 18 of the core box, a single spring 35 being arranged between the sliding detents 33 to move them outwardly to cooperate with stops 36 limiting their outward movement. These detents have bevelled portions 37 and shoulders 38 at the upper ends of the bevelled portions 37. The central opening in the top of the mold box is provided with an annular bevelled portion 39 and an annular shoulder 40 below said annular bevelled portion 39. When the mold box and the core box are brought together, the tapered projection 34 on the core box together with the detents enter into the circular opening of the mold box, the bevelled portions of the detents cooperating with the annular bevelled portion 39 and forcing the detents toward each other until the shoulder 40 is reached, when the detents move outwardly under the action of the spring 35, bringing the shoulders 38 on the detents in engagement with the annular shoulder 40 on the mold box. At the time the detents 38 engage with the shoulder 40, the circular tapering centering projection 34 will cooperate with the annular bevelled portion 39 and maintain the mold box in centered relation with reference to the core box.

The disconnection of a mold box and a core box may be effected in any suitable manner. In this instance, within the tubular portion 12 of each mold box a tubular plunger 41 is arranged, this tubular plunger projecting at 42 through the bottom 5 of the mold box and having at its upper end an annular flaring portion 43 which is adapted to cooperate with the bevelled portions 37 of the detents 33, so as to move said detents toward each other and out of engagement with the annular keeper shoulder 40. Movement of the plunger 41 may be limited by an annular projection 44 which operates in the space 13 of the tubular member 12, an annular plate 45 being secured to the bottom member 5 to cooperate with the under side of this flange in order to limit the outward movement of the detent operating plunger 41.

A novel mechanism is provided for moving the core and mold boxes in order that the core boxes, with the baked articles, may be readily removed. In this instance, all of the core boxes are rigidly secured to a carrier which rotates about an upright axis to carry the core boxes in an endless or circular path in a horizontal plane, while the mold boxes are moved toward and from this plane in order to connect with and to separate from the core boxes and are also moved away from and toward the axis of revolution of the core boxes in order that the mold boxes may be filled with batter and the core boxes may have the baked articles removed therefrom while the mold boxes are disconnected from the core boxes.

Figure 10:
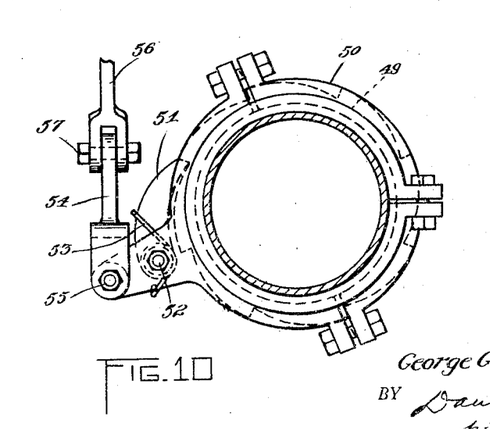
Fig. 10 is a detail view showing part of the mechanism for turning the rotary carrier.

This result, in this instance, is obtained by providing a carrier frame in the form of a multi-arm spider 46, which has the core boxes rigidly secured to the outer ends of the arms thereof and which has a hollow standard 47, journalled in a bed 48, the movement of this standard being intermittent or step by step and being effected in any suitable manner, as for instance, see Fig. 10, through the medium of a toothed ring or member 49, secured to the lower end of the standard 47, below the table 48, the portion of the tubular standard 47 below the table 48 also having a ring 50 turning thereon and carrying a pawl 51 which is pivoted to the ring at 52 and held to the ratchet ring 49 by a spring 53. This ring 50 also has a link 54 pivoted at 55 thereto and to this link an arm of a double arm lever 56 is pivoted at 57. The double arm lever is pivoted at 58 to a bracket 59 depending from the under side of the bed 48, and is also connected by a link 60 with an eccentric ring 61 which surrounds an eccentric 62 on a drive shaft 63.

Figure 8:
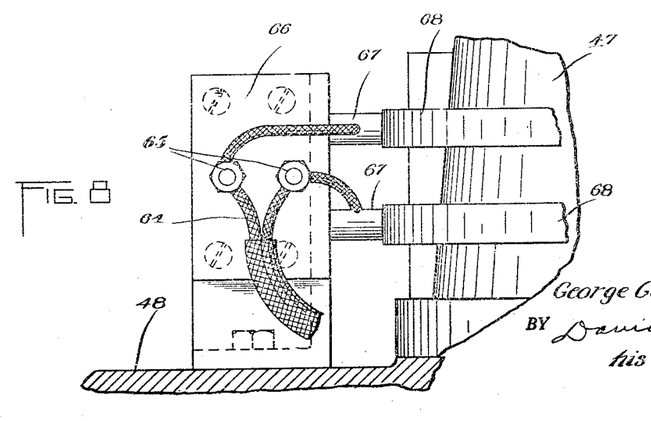
Fig. 8 is a detail view showing the manner in which the electrical current is delivered from the bed to the rotary carrier.

In order that electrical connection may be established between the line wires 64 connected with a source of electric current for heating the heating coils 14 and 30, two terminals 65 are supported on an insulated support 66 on the bed 48, these terminals 65 being connected to brushes 67 (see Fig. 8) bearing upon two conductor rings 68 which are insulated from each other at 69 and are supported by and about the tubular port 47. Wires 69a lead from said conductor rings 68 through the post and the hollow spider to binding posts 70 on the core boxes, these binding posts being connected electrically to both of the heating coils in the manner hereinbefore described, so that the coils 14 and 30 of each mold are in multiple.

Figure 9:
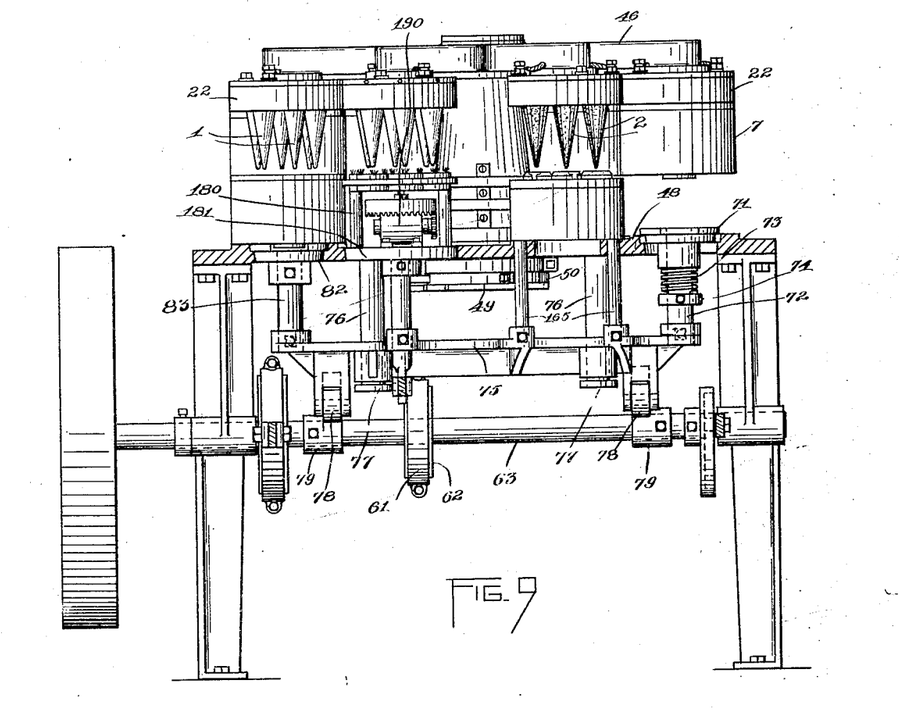
Fig. 9 is a section on the line 9—9, Fig. 1.

With the purpose in view of operating the detent operating plunger 41 and at the same time for the purpose of carrying the mold boxes away from the core boxes, after being released from the mold boxes, there is provided a disconnecting means such as a reciprocating carrier 71 in the form of a head having a yielding movement on a vertical reciprocating plunger 72, this yielding movement being provided by permitting the head 72 to slide on the plunger and to bear against a helical spring 73 which surrounds the plunger and also engages an adjustable collar 74 on the plunger. The plunger 72 (see Fig. 9) is supported on a frame 75 which is situated beneath the bed 48 and guided vertically on the bed by rods 76 depending from the under side of the bed and having headed ends 77 which limit the downward movement thereof. Movement of this frame may be effected in any suitable manner, but, in this instance, it carries two rollers 78 which bear on eccentrics 79 mounted on the drive shaft 63, the operation of these eccentrics being such that, when a core box with a mold box fastened thereto is positioned above the carrier 71, said carrier 71 moves upwardly to engage the bottom of the mold box and thereafter yields to permit the upper end of the plunger 72 to cooperate with the lower end of the detent operating plunger 41, thus effecting the disconnection of the detents with the mold box which through its weight carries the shoulder 40 below the engaging surface of the detents through the yielding of the carrier 71, so that with the descent of the carrier through the lowering of the plunger 72, the mold box will descend and move away from the core box, the baked articles being maintained on the cores through the engagement of said baked articles with the walls of the annular grooves 4 at the lower ends of the cores.

Figure 6:
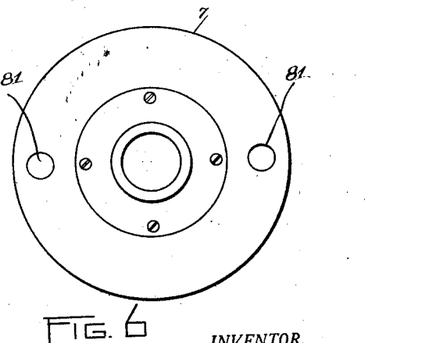
Fig. 6 is a plan view of the bottom of one of the mold boxes.
Figure 7:
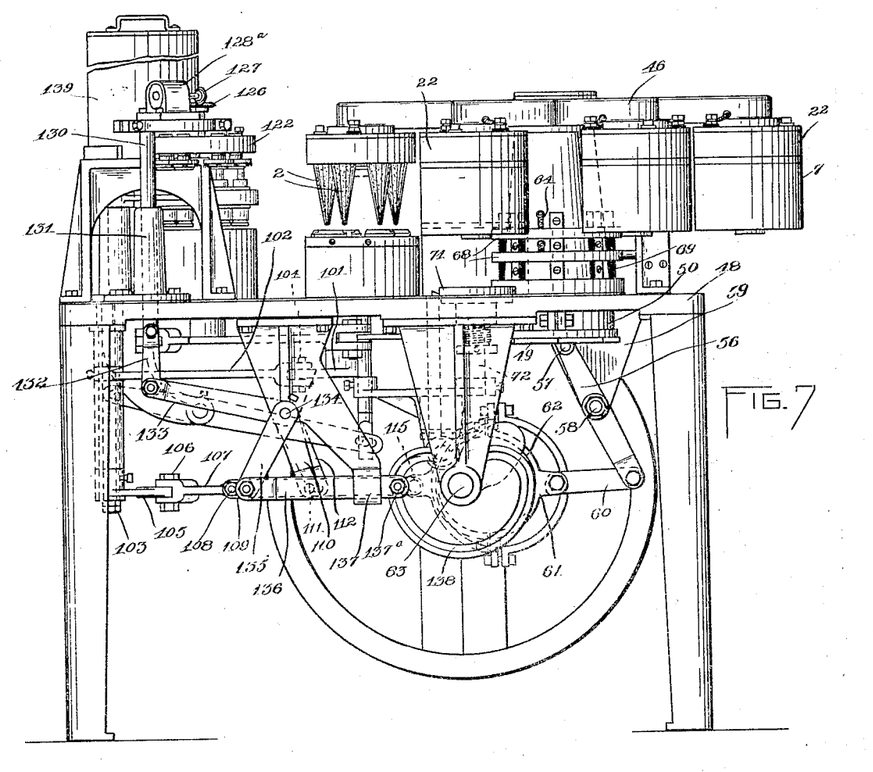
Fig. 7 shows the invention in side elevation.

In order to provide for the movement of the mold boxes away from the axis of rotation of the core boxes, the bed 8 is formed with a trackway or guideway 80 on its top surface, this guideway being at its central part in the form of a semi-circle or arc and having its ends substantially straight and converging. This guideway leads from the carrier 71, when the latter is in its lowermost position, the mold box projecting beyond the periphery of the carrier and having in its projecting portion (see Fig. 6) two diametrically arranged openings 81 in which suitable operating mechanism, to be described, engages for the purpose of carrying the mold box along the trackway to a position where a mechanism is provided directly below the core box carrier for elevating the mold boxes into connection with the core boxes.

The connecting means or elevating mechanism is in the form of a head or support 82 (see Fig. 9) rigidly secured to a plunger 83 which in turn is rigidly secured to the reciprocating frame 75, so that when the carrier 71 moves toward one of the mold boxes to disconnect such mold box from a core box, the elevator 82 will lift another mold box into connection with another core box.

The mechanism for moving the mold boxes on the trackway from the disconnecting means or carrier to the connecting means or elevating carrier may be of any suitable construction. In this instance, there is provided a swinging frame 84, arranged beneath the bed 1 on a rock shaft 85 and having two arms 86 and 87. The arm 86 has a link 88 pivotally connected thereto at 89 and this link carries a spring pressed detent 90 which has one side thereof bevelled at 91, the portion of the link in which the detent operates being extended through a slot 92 in the bed 48 running parallel with the guide or trackway on which the mold boxes travel. An annular shoulder 93 is provided on the link to engage with the trackway above the slot 92, in order to confine the detent for travelling parallel with said guide or trackway. The detent 90 moves into close proximity to the mold box on the disconnecting carrier 71, so that said detent may engage in one of the openings 81 in the mold box. After such engagement the swinging arm 86 moves to carry the mold box off the carrier 71 onto the trackway and along the same until the first dotted line position a (Fig. 3) is reached when the swinging arm returns to its original position. In order to facilitate the movement of the mold boxes off the disconnecting carrier 71, the latter is provided with a recess or pocket 94 through which the propecting portion 42 of the tubular plunger 41 operates, this projecting portion cooperating with the guide or trackway on opposite sides of the slot 92 to hold the mold boxes to such trackway during its movement by the mold box moving mechanism. After the mold box reaches the position a, shown in dotted lines, Fig. 3, it passes over a retaining detent 95 in the form of a spring pressed plunger bevelled on one side to permit the travel of the mold box thereover, while engaging back of the mold box to prevent the return thereof, with the return movement of the detent 90. After the detent 90 cooperates with a mold box on the receiving or disconnecting carrier 71, a spring pressed detent 96 on the arm 86 in advance of the detent 90 will engage in the rearmost opening 81 in the bottom of the mold box, so that upon the forward movement of the arm 86, this detent 96 will shift the mold box to the dotted line position $b$, Fig. 3, where said mold box will be held by a spring pressed detent 97 similar to the spring pressed detent 95.

Figure 3:
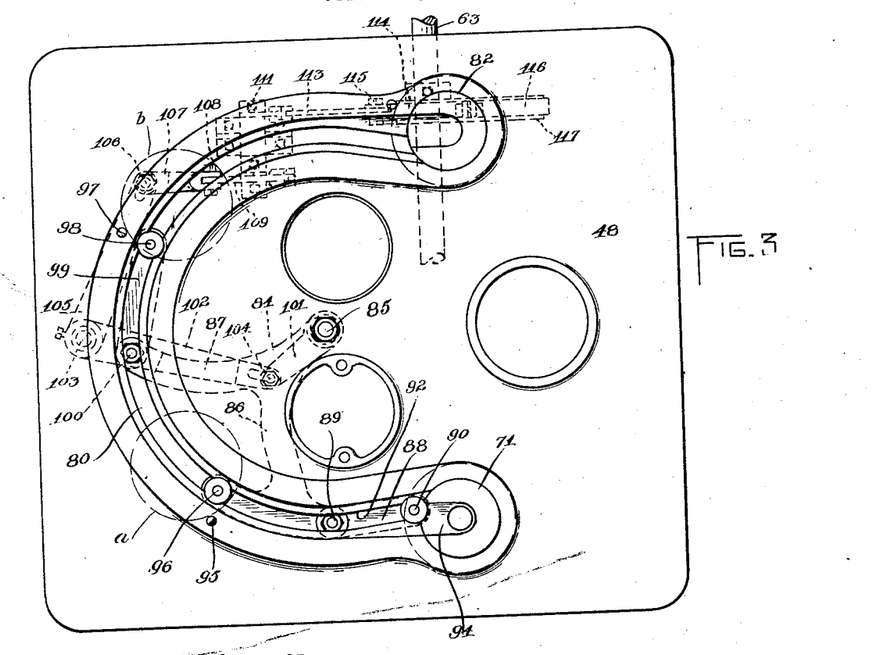
Fig. 3 is a plan view of the bed or trackway on which the mold boxes are moved.
Figure 4:
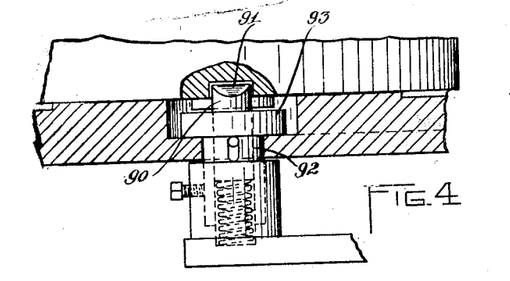
Fig. 4 is a sectional view showing the manner in which the mold boxes are engaged by the moving means on the trackway or bed.
Figure 5:
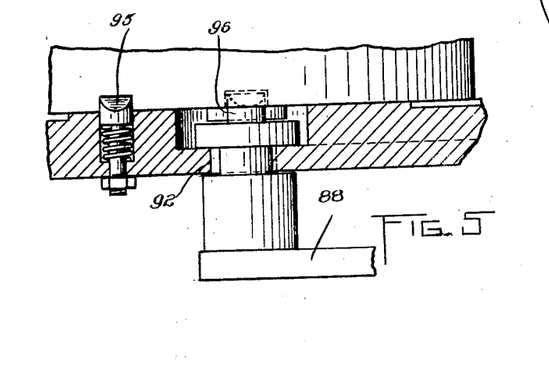
Fig. 5 is a detail view showing the manner in which the mold boxes are held against return movement on the trackway or bed.

From the position $b$, Fig. 3, the mold box is moved to the elevating carrier or support 82 at the opposite end of the trackway. This is effected through a spring pressed pawl 98 similar to the pawl 90 guided in the trackway and mounted on one end of a link 99, which is pivotally connected at 100 to one end of the arm 87 on the swinging frame 84, this spring pressed detent 98 engaging with the mold box, while the latter is in dotted line position $b$, Fig. 3, and carrying said mold box to the elevating carrier 82.

Movement of the swinging frame 84 may be effected in any suitable manner. In this instance, the shaft 85 has an arm 101 to which an arm 102 on the shaft 103 is connected through a pin and slot connection 104. An arm 105 on the shaft 103 through a pin and slot connection 106 connects with the link 107, which in turn is connected by a pin at 108 to a link 109 that is pivotally connected to the lower end of an arm 110 on a rock shaft 111. The rock shaft is operated by an arm 112 thereon connected to a sliding pitman 113 which is guided in the bracket 114 depending from the under side of the table 48, the end of this pitman being pivotally connected at 115 to a ring 116 about an eccentric 117 on the shaft 63, so that the moving mechanism for the mold boxes operates in timed relation to the disconnecting carrier and the elevating carrier.

Figure 32:
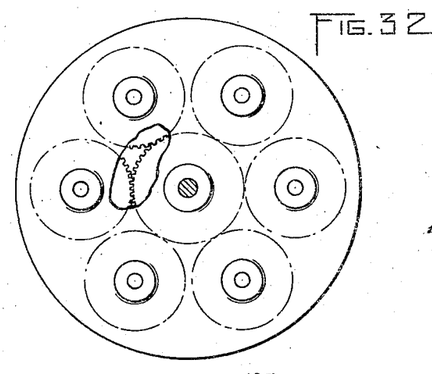
Fig. 32 is a plan view, with parts broken away, of the brushing means for the mold boxes.
Figure 33:
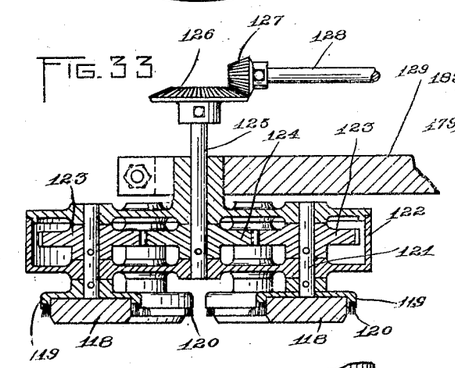
Fig. 33 is a sectional view of the said brushing means.
Figure 34:
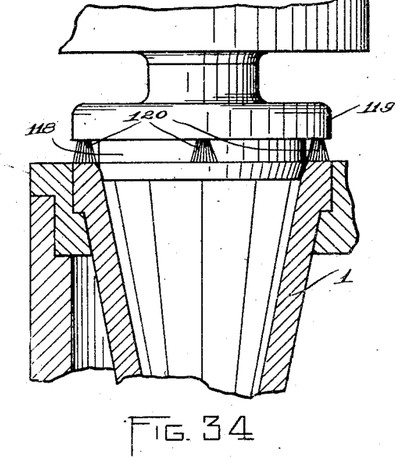
Fig. 34 is a detail view showing said brushing means cooperating with a mold.

At the position $a$, Fig. 3, the mold boxes are subjected to a brushing action for removing from the upper ends of the molds any pieces of the baked material. In Figs. 32, 33 and 34, there is illustrated in detail one form of brushing means, which may be employed. This brushing means embodies a plurality of centering blocks 118, each adapted for fitting in the upper end of each mold. Each block is fitted in a cup-shaped member 119, which has its surrounding edges provided with a number of brushes 120 adapted to cooperate with the upper end of a mold, when the centering block fits in such end. The cup shaped member with its brushes and the centering block is rotatably mounted and to this end is rigidly secured to a shaft 121 in a gear casing 122, enclosing an annular series of gears 123, each of which is secured to one of the shafts 121 and each of which meshes with a central gear 124. The central gear 124 is secured to a shaft 125 which extends to the exterior of the casing and is provided with a bevelled gear 126, meshing with a bevelled pinion 127, on a shaft 128. The shaft 128 is mounted upon a support 129, which also acts as a support for the gear casing and an electric motor 128$^a$ which drives the shaft 128 on the brushes 120.

The mold boxes at the position $a$, Fig. 3, and the brushing means are relatively movable, this being, in this instance, effected by moving the support 129 relatively to the mold box. For this purpose the support 129 is mounted on a sliding plunger 130, guided in a guide tube 131 on the main frame 48, and having a link 132 connected thereto and to an arm 133 on a rock shaft 134, this rock shaft having also an arm 135 thereon, which is pivotally connected to one end of a slide 136 guided in a bracket 137 depending from the under side of the support 48. This slide 136 has a pin 137$^a$ operating in a cam groove 138 in a cam secured to the shaft 63, so that the brushing mechanism for the mold boxes operates in timed relation to the mold box feeding mechanism.

Arranged adjacent the position $b$, Fig. 3, is the batter charging mechanism. In this embodiment this comprises a battery tank 139 connected by a valve connection 140 with the charging head 141 that is supported through a split band 142 from an arm 143 extending laterally from a tubular post 144 projected upwardly from the table or support 48. The head 141 has a number of discharge spouts 145 corresponding to the number of molds in each mold box, six in this instance. At the upper end of each of these spouts and preferably forming a continuation thereof is an extension 146 provided with a lateral intake opening 147. This opening 147 provides for the flow of the batter into the the spout or nozzle which with the extension 146 acts as a measuring chamber for measuring the amount of batter to be fed. This result is secured, in this instance, by providing two valve members 148 and 149, the former being of cylindrical form and operating in the measuring chamber and the latter being tapered at its upper portion and fitting snugly in the lower end of the measuring chamber. In order that the valve member 148 may move to open the passageway 147, after the valve member closes the lower end of the measuring chamber, and may also close said passageway 147 before the valve member 145 opens the lower end of the measuring chamber, relative movement is provided, this being effected, in this instance, by mounting the valve member 148 in a tubular plunger 150 and mounting the valve member 149 adjustably on the lower end of a stem 151 which operates longitudinally in the hollow stem 150. The stem 151 extends entirely through the stem 150, and, beyond the upper end of the stem 150, an elastic member 152 is arranged in the form of a spring abutting the end 150 while the other end abuts an adjustable abutment 153. In order to limit the movement of the valve member 148 relatively to the valve member 149 an adjustable nut 154 is provided on the valve stem 151 below the valve 148.

Figures 11, 12, 13, 14, 15:
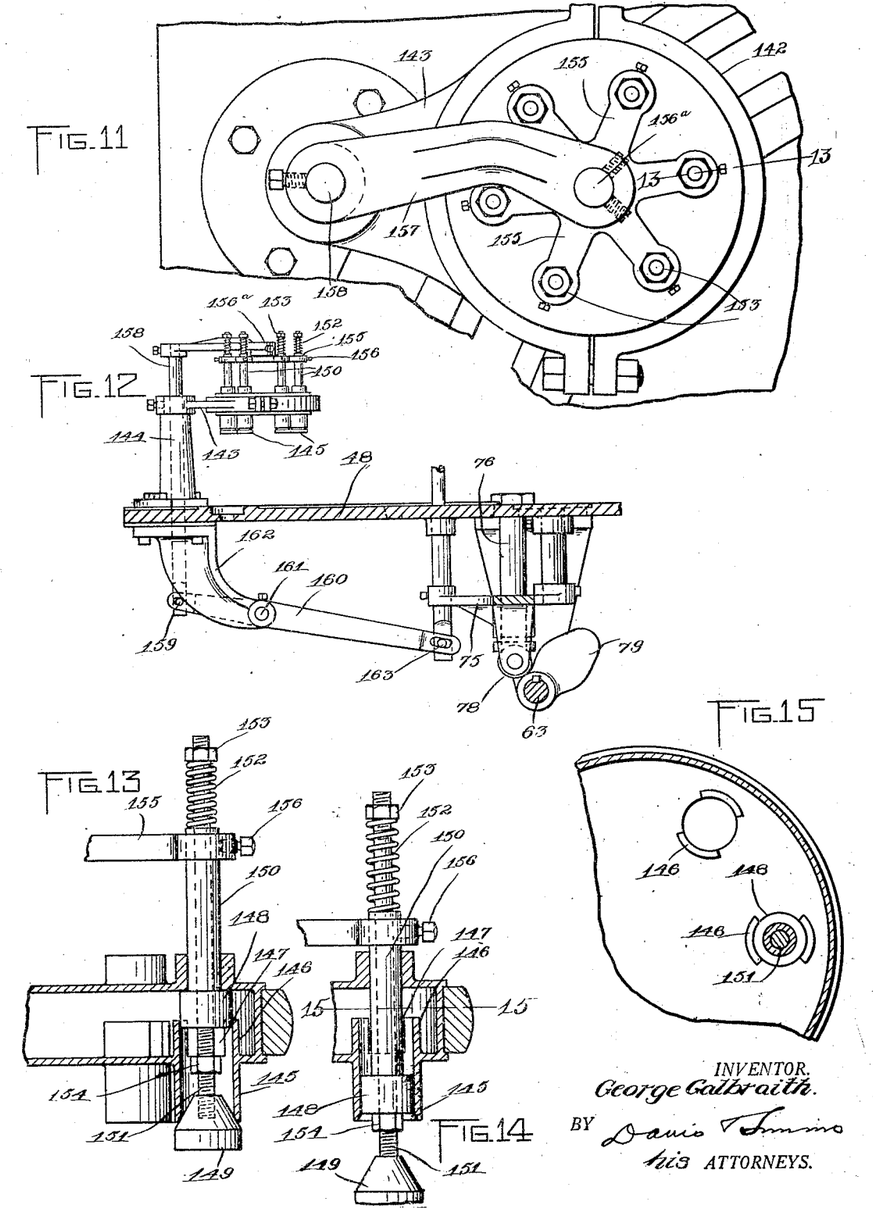
Fig. 11 is an enlarged fragmentary plan view of the filling or charging devices for the molds.
Fig. 12 is a fragmentary view showing the filling or charging devices in side elevation.
Fig. 13 is an enlarged section on the line 13—13, Fig. 11, showing one of the filling or charging devices in one position.
Fig. 14 is a similar view showing a filling or charging device in discharging position.
Fig. 15 is a section on the line 15—15, Fig. 14.

Assuming that the parts are in the position as shown in Fig. 13 and it is desired to supply a measured amount of batter to the molds of a mold box, the tubular plungers 150 are lowered causing the valve members 148 to close the passageways 147 through which batter has previously entered the measuring chambers. After the valve members 148 have closed the passageways 147, the valve members 148 will coop&rate with abutments 154 and thereafter the stems 150 and 151 will move together, discharging the entire contents of the measuring chambers into the molds of the mold box arranged below said charging mechanism.

The downward movements of the valve members 148 and 149 are effected preferably through a spider or head 155 which has its arms secured by set screw 156 to the hollow stems 150. To the central portion of this spider, through a central boss 156ᵃ thereon, an arm 157 is secured, this arm in turn being secured to a plunger 158 which is guided in the hollow standard 144 and extends below the table or support where it is pivotally connected at 159 with one arm of a lever 160, pivoted at 161 to a bracket 162 depending from the under side of said support or table 48. The other arm of this lever 160, see Fig. 12, is connected at 163 with the vertically movable frame 75 operated from the cam 79 in the manner hereinbefore set forth, thus causing the charging mechanism to operate in timed relation to the other operations of the machine. After the charging has taken place at the station b, the mold box is carried to the elevating member or carrier 82, where it is again connected with a core box.

Figures 26, 27, 28, 29, 30, 31:
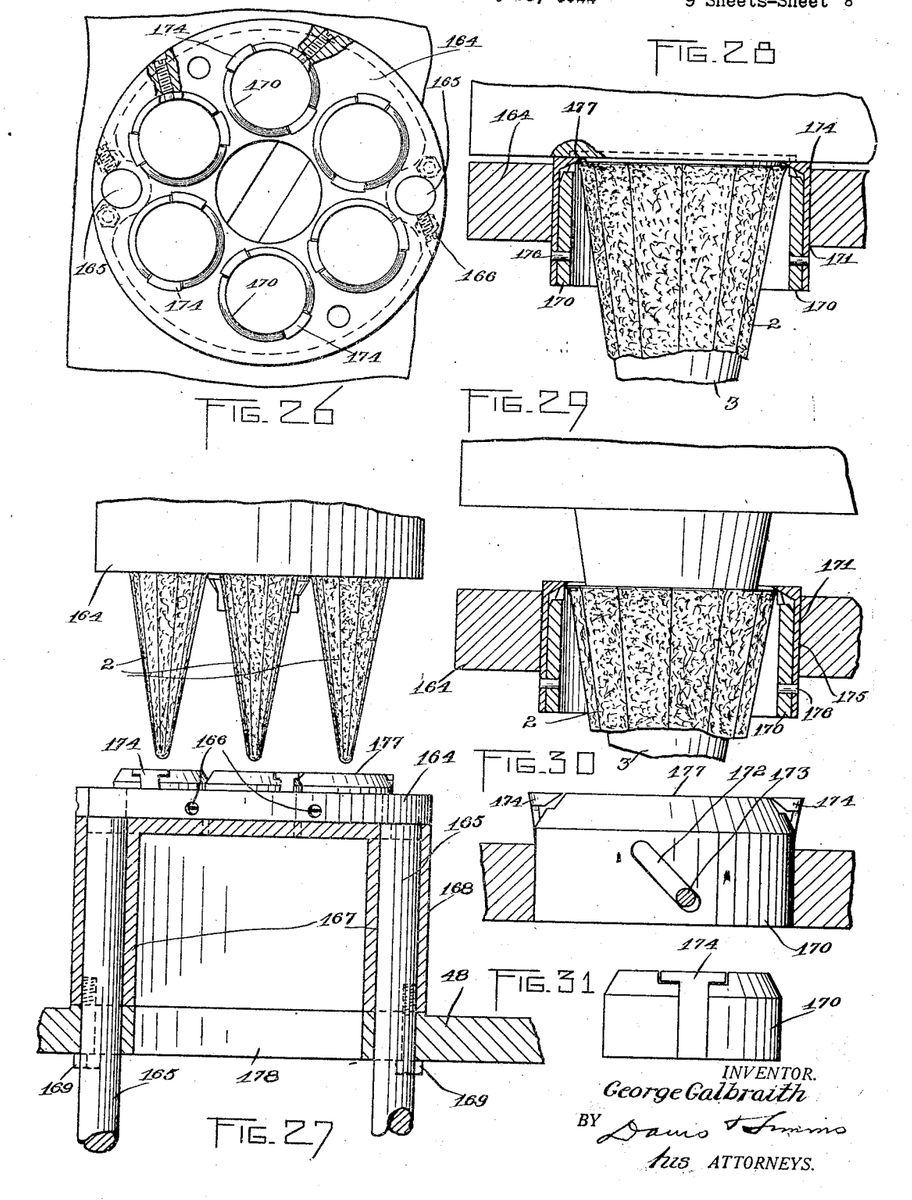
Fig. 26 is a top face view partially in section of the combined trimming and stripping means for the cones.
Fig. 27 is a detail sectional view showing the manner in which the combined stripping and trimming means cooperates with the cones on the core box.
Fig. 28 is a detail view showing the manner in which the stripping and trimming devices cooperate with a cone on a core.
Fig. 29 shows the stripping and trimming devices removing a cone from a core.
Figs. 30 and 31 are two detail views of the stripping and trimming devices.

The core boxes maintain their connection with the carrier 46 and therefore travel in an endless path. After a mold box has been disconnected from a core box, the core box proceeds from the disconnecting carrier to the positions c and d and finally to the elevating carrier by successive steps. At the position c, the core box is operated upon by a core trimming and removing or stripping mechanism, illustrated in Figs. 26 to 31, inclusive. This mechanism embodies a plurality of devices corresponding in number to the number of cores on each core box. In this instance, this cone trimming and stripping mechanism comprises a head 164 formed with openings and having guide rods or plungers 165 secured thereto at 166 and operating through guides 167 in the cylindrical base member 168 which by screws 169 is secured to the table 48. These guide rods 165 extend through the table or support 48 and connect with the frame 65 to operate in timed relation to the other mechanism of the machine. Each cone trimming and stripping device, in this instance, embodies a ring 170 which has an axial and also a rotary movement in an opening 171 formed in the head 164, this being effected by providing each ring with a slot 172 arranged at an angle other than a right angle to the axis of the ring and a guide pin 173 secured in the head 164. This guide pin 173 by its cooperation with the wall of the slot 172 causes the rotary or turning movement of said ring 170 upon the axial movement of such ring. This ring carries two curved trimmers and strippers 174 arranged, in this instance, at diametric points near the upper edge of the ring and having spring arms 175 which are secured near their lower ends at 176 to the ring, the outer faces of said arms engaging with the walls of an opening 171 and tending to hold the ring in its adjusted position in the opening. When the head 164 is in its lowermost position, the lower ends of the cutting rings 170 cooperate with the top of the base member 168, thus causing the rings to be projected from the upper surface of the head 164 and the cutters 107 to move away from each other, as shown in Fig. 30. When the head 164 is moved upwardly, the upper knife edge 177 of the annular ring or cutter cooperates with the core box about the core and enters an annular groove or notch 178 formed in the core box about said core, thus forming a smooth cut periphery at the upper end of the cone. After the bevelled cutting edge 177 engages the core box, the ring 170 is moved inwardly in the head 164 and this moves the cutters 174 toward each other and, at the same time, causes said cutters to rotate in order to cut and to loosen the upper end of the cone. This continues until the upward movement of the head 174 has been completed when the parts will occupy the positions shown in Fig. 28. Now, when the head 164 is lowered, the frictional engagement between the arms 175 of the strippers and cutters 174 and the walls of the opening 171 will be such that the trimming and stripping rings 170 will maintain their adjusted positions in the head 164 and, as a consequence, the cones will be stripped from the cores 3 in the manner illustrated in Fig. 29, passing through openings in the base frame 164 and through an opening 178 in the table or support 48 to be delivered into any suitable receptacle.

Figure 1:
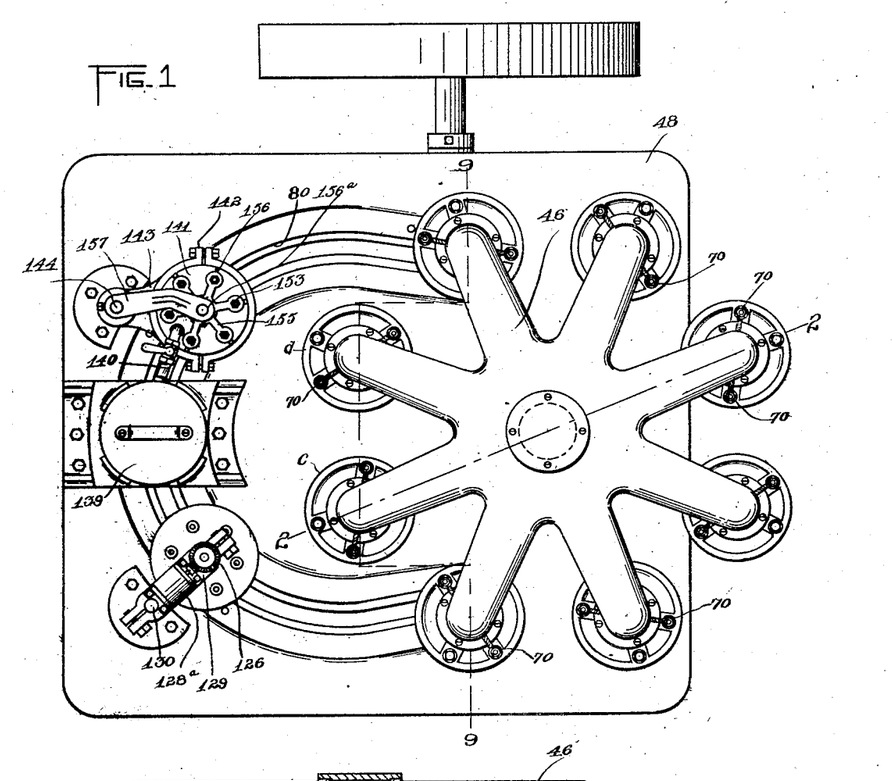
Fig. 1 is a plan view of a machine constructed in accordance with this invention.
Figure 2:
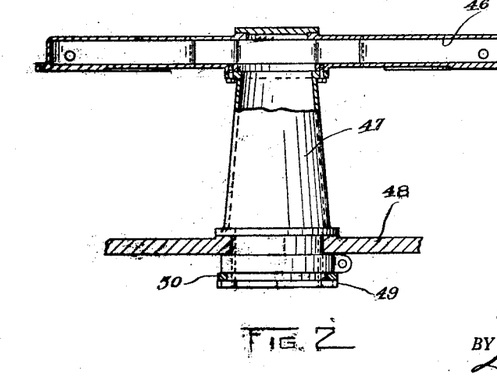
Fig. 2 is a section on the line 2—2, Fig. 1 of the rotary carrier.
Figure 35:
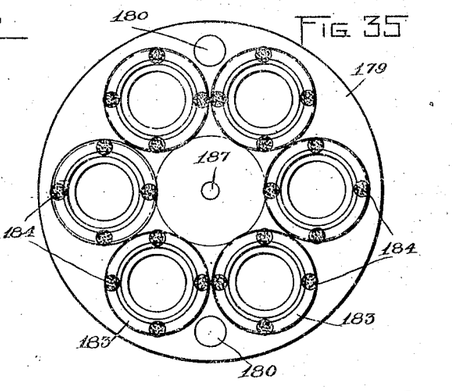
Fig. 35 is a plan view of the brushing means for the core boxes adjacent the upper ends of the cores.
Figure 36:
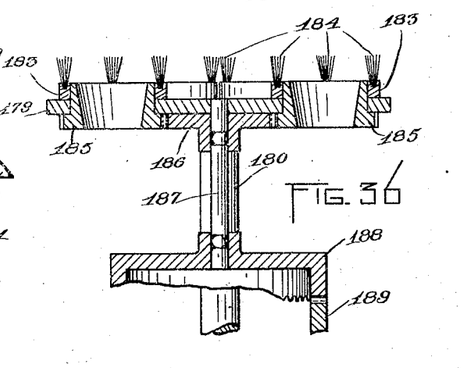
Fig. 36 is a section on the line 36—36, Fig. 35.
Figure 37:
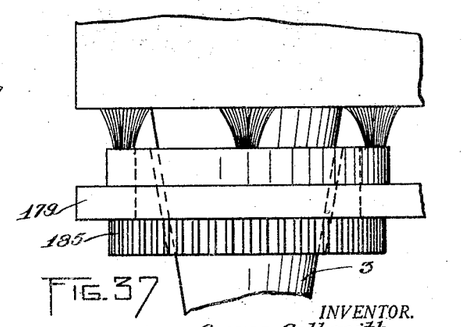
Fig. 37 is a detail view showing the last mentioned brushing means cooperating with the mold box adjacent the upper end of the core.

After the core boxes pass from the position c, Fig. 1, they move to the position d where the core boxes are acted upon by a suitable brushing mechanism for removing the surplus material from the core boxes around the cores. A brushing mechanism for producing this result is shown in Figs. 35 to 37 inclusive. This brushing mechanism embodies a disk 179 supported by standards 180 from a plate 181 which by a stem 182 connects with the vertically movable frame 75, so as to be operated in timed relation to the other operating mechanism of the apparatus. Mounted to turn in the head 179 are a plurality of rotary brush carriers 183, each in the form of a ring adapted to receive one of the cones therethrough and each carrying a plurality of upwardly projecting brushes 184, which are adapted to cooperate with the core box adjacent one of the cores. Each brush carrier also has a gear 185 formed thereon through which the brush carrier may be turned, this gear meshing with a centrally arranged gear 186 secured to a shaft 187 on which a crown gear 188 is also arranged. This crown gear in turn meshes with a gear 189 on a shaft of a motor 190 supported on the disk 181, this motor being controlled in any suitable manner.

The operation of the invention will be understood from the foregoing description, but it may be summarized as follows: The batter is placed in the molds 1 of the mold box by the charging mechanism, while the mold box is in the position b, Fig. 3, and thereafter this mold box is carried to the elevating carrier 82 which moves it upwardly into interlocking connection with a bore box on the rotary carrier 46. This also establishes the electrical connection of the heating coil of the mold box with the electrical source through the core box, so that the batter in the molds which has been shaped into the form of cones by the cores of the core box starts to bake. This baking action is continued until the mold box reaches the disconnecting carrier 71 and the latter effects such disconnection and lowers the mold box to the trackway, the baked cones being held on the core box and shifting to the position c where they are acted upon by the combined trimming and stripping mechanism, which removes the cones, the core box thereafter being carried to the position d where it is subjected to the brushing action by a brushing mechanism before the core box again reaches the position over the elevating carrier 82. The mold box after leaving the disconnecting carrier 71 is carried to the position a where it is subjected to a brushing action and thereafter is moved to the position b for recharging with the batter.

From the foregoing it will be seen that there has been provided a baking machine in which the mold elements, namely, the mold proper and the core, are formed of porous material and a lubricating oil passes through the walls of this material to maintain the mold elements in a lubricated condition. The lubricating oil also serves as a heating medium for the mold elements, thus making it possible to maintain a substantially even heat in such elements and dispensing with a flame or burner playing upon the mold elements. The core boxes travel in an endless path and the mold boxes are moved toward and from the core boxes, thus permitting the ready charging of the mold boxes with the batter while the mold boxes are disconnected from the core boxes. The cores are provided with means which withdraw the baked articles from the molds when the molds are separated from the cores. Trimming means acts on the baked articles, while the latter are on the cores to trim the edges of the articles and, at the same time, to strip such articles from the cores.

What I claim as my invention and desire to secure by Letters Patent is:

1. A baking machine comprising a liquid containing box having openings in one wall thereof, cores, each having portions fitting in said openings and a shoulder engaging the wall of the box about said openings, each core also being hollow and having an anchoring cross piece in its hollow portion, a cross piece bridging each opening of the box, and bolts connecting said cross pieces in the box and the cross pieces in the hollow cores.

2. A baking machine comprising a core box, a mold box, locking devices carried by one of said boxes and cooperating with the other of said boxes, and a plunger slidably movable on the member with which the locking devices engage for moving said locking devices to unlocking position.

3. A baking machine comprising two boxes, each having a mold element, one of said boxes having a centering opening with tapered walls and the other having a centering projection for cooperating with said opening, a pair of locking detents, mounted on said centering projection and adapted to cooperate with the tapered walls of the centering opening, spring means for projecting said detents outwardly, and a shoulder with which said detents engage to lock the boxes together.

4. A baking machine comprising two boxes, each having a mold element, one of said boxes having a centering opening with tapered walls and the other having a centering projection for cooperating with said opening, a pair of locking detents, mounted on said centering projection and adapted to cooperate with the tapered walls of the centering opening, spring means for projecting said detents outwardly, a shoulder with which said detents engage to lock the boxes together, and a plunger mounted on the box in which the centering opening is provided for cooperating with the detents to move them toward each other in order to release them from the shoulder.

5. A baking machine comprising two boxes, each having a mold element carried thereby for cooperating with the mold element on the other box, two separate electrical heaters, one mounted on each of the boxes, and contacts carried by the respective boxes through which one of the heating elements is brought into electrical connection with the other.

6. A baking machine comprising a series of core boxes movable in a circular path in a horizontal plane, a series of mold boxes, means for suspending the mold boxes from the under side of the core boxes to cause the mold boxes to travel with the core boxes, lowering means for disconnecting the mold boxes from the core boxes, and means for elevating the mold boxes to the core boxes to effect the connection of the mold boxes with the core boxes.

7. A baking machine comprising a series of core boxes movable in a circular path in a horizontal plane, a series of mold boxes arranged to cooperate with the core boxes, means connecting the mold boxes with the core boxes to cause the mold boxes to travel with the core boxes, a disconnecting means for disconnecting the mold boxes from the core boxes and lowering them away from the core boxes, a connecting means for moving the mold boxes into connection with the core boxes, and means for moving the mold boxes from the disconnecting means to the connecting means in a horizontal plane and to one side of the path of travel of the core boxes.

8. A baking machine comprising a series of core boxes movable in an endless path, a series of mold boxes, means for connecting the mold boxes with the core boxes to cause the mold boxes to travel with the core boxes, a vertically movable disconnecting member for carrying the mold boxes away from the core boxes, a vertically movable connecting member for carrying the mold boxes to the core boxes, a trackway connecting the disconnecting member and the connecting member, and means for moving the mold boxes along said trackway from the disconnecting member to the connecting member.

9. A baking machine comprising a series of core boxes movable in an endless path, a series of mold boxes, means for connecting the mold boxes with the core boxes to cause the mold boxes to travel with the core boxes, a vertically movable disconnecting member for carrying the mold boxes away from the core boxes, a vertically movable connecting member for carrying the mold boxes to the core boxes, a trackway connecting the disconnecting member and the connecting member, means for moving the mold boxes along said trackway from the disconnecting member to the connecting member, and charging means for the mold boxes arranged to charge said boxes while they are on said trackway.

10. A baking machine comprising a series of core boxes movable in an endless path, a series of mold boxes, means for connecting the mold boxes with the core boxes to cause the mold boxes to travel with the core boxes, a vertically movable disconnecting member for carrying the mold boxes away from the core boxes, a vertically movable connecting member for carrying the mold boxes to the core boxes, a trackway connecting the disconnecting member and the connecting member, means for moving the mold boxes along said trackway from the disconnecting member to the connecting member, and means for cleaning said mold boxes while they are on said trackway.

11. A baking machine comprising a series of core boxes movable in an endless path, a series of mold boxes, means for connecting the mold boxes with the core boxes to cause the mold boxes to travel with the core boxes, a vertically movable disconnecting member for carrying the mold boxes away from the core boxes, a vertically movable connecting member for carrying the mold boxes to the core boxes, and a trackway connecting the disconnecting member and the connecting member comprising a reciprocatory detent arranged to engage with the mold boxes and carry them along the trackway.

12. A baking machine comrpising a series of core boxes movable in an endless path, a series of mold boxes, means for connecting the mold boxes with the core boxes to cause the mold boxes to travel with the core boxes, a vertically movable disconnecting member for carrying the mold boxes away from the core boxes, a vertically movable connecting member for carrying the mold boxes to the core boxes, a trackway connecting the disconnecting member and the connecting member, and means for moving the mold boxes along said trackway from the disconnecting member to the connecting member embodying two reciprocatory detents one of which moves the mold boxes from the disconnecting member onto the trackway and the other of which moves the mold boxes from the trackway onto the connecting member.

13. A baking machine comprising a series of core boxes movable in an endless path, a series of mold boxes, means for connecting the mold boxes with the core boxes to cause the mold boxes to travel with the core boxes, a disconnecting member for carrying the mold boxes away from the core boxes, a connecting member for carrying the mold boxes to the core boxes, a trackway connecting the disconnecting member and the connecting member, and means for moving the mold boxes along said trackway from the disconnecting member to the connecting member comprising three reciprocatory detents, one of which moves the mold boxes from the disconnecting member along the trackway to a first position, another of which moves the mold boxes along the trackway to a second position, and a third of which moves the mold boxes from the second position to the connecting member.

14. A baking machine comprising a series of core boxes movable in an endless path, a series of mold boxes, means for connecting the mold boxes with the core boxes to cause the mold boxes to travel with the core boxes, a disconnecting member for carrying the mold boxes away from the core boxes, a connecting member for carrying the mold boxes to the core boxes, a trackway connecting the disconnecting member and the connecting member, means for moving the mold boxes along said trackway from the disconnecting member to the connecting member comprising three reciprocatory detents, one of which moves the mold boxes from the disconnecting member along the trackway to a first position, another of which moves the mold boxes along the trackway to a second position, and the third of which moves the mold boxes from the second position to the connecting member, cleaning means acting on the mold boxes while they are in the first position, and mold charging means arranged to charge the molds while they are in the second position.

15. A baking machine comprising a series of core boxes movable in a circular path in a horizontal plane, a series of mold boxes, means for locking a mold box to a core box, a vertically movable carrier through which the mold boxes are lowered away from the core boxes, and means for moving with said carrier for effecting the operation of the locking means for locking a mold box to a core box.

16. A baking machine comprising a series of core boxes movable in an endless path, a series of mold boxes, locking means carried by each core box for engaging with a mold box to cause the mold box to travel with the core box, an operating member for said locking means carried by each mold box, and a disconnecting means for disconnecting the mold boxes from the core boxes, said disconnecting means comprising a plunger arranged to cooperate with the operating member of the mold box to effect the operation of the locking devices to release the mold box from the core box.

17. A baking machine comprising a series of core boxes movable in an endless path, a series of mold boxes, locking means carried by each core box for engaging with a mold box to cause the mold box to travel with the core box, an operating member for said locking means carried by each mold box, a disconnecting means for disconnecting the mold boxes from the core boxes, said disconnecting means comprising a plunger arranged to cooperate with the operating member of the mold box to effect the operation of the locking devices to release the mold box from the core box, and a carrier yieldingly supported by said plunger.

18. A baking machine comprising a series of core boxes movable in an endless path, a series of mold boxes, locking means for connecting each mold box with a core box to cause the molding box to travel with the core box, disconnecting means for said locking means, comprising a plunger for effecting the operation of said locking means, and a carrier yieldingly supported on said plunger.

19. A baking machine comprising a carrier turnable about a vertical axis, a plurality of core boxes mounted in an annular series on said carrier, a plurality of mold boxes, locking means for connecting said mold boxes with the core boxes to cause the mold boxes to travel with the core boxes, a vertically movable frame, a disconnecting means mounted on said frame and movable therewith to release the locking devices and lower the mold boxes, a connecting means movable with said frame to connect the mold boxes with the core boxes, a trackway leading from the disconnecting means to the connecting means, and means for moving the mold boxes from the disconnecting means along the trackway to the connecting means.

20. A baking machine comprising a core and stripping mechanism for a baked article on the core embodying a stripping ring through which the baked article and core are adapted to be extended, and means for producing a relatively turning movement between the ring and the core.

21. A baking machine comprising a mold, a core, means for causing the baked article to be removed from the mold by the core, a ring through which said core and the baked article are adapted to be extended, said ring having an axial movement, means for imparting a rotary movement to the ring during such axial movement, and means carried by the ring for disconnecting the baked article from the core.

22. A baking machine comprising a core, a box having a core projecting therefrom, a ring through which the core and the baked article thereon are adapted to be extended, said ring having an axial movement, and devices carried by the ring and movable thereon during the axial movement to disconnect the baked article from the core.

23. A baking machine comprising a core box having a core projected therefrom, an annular groove at the base of said core, and a trimming ring having a cutting edge adapted to enter said groove, said ring being rotatable and having a plurality of stripping devices for engagement with the baked article at the base of the core.

24. A baking machine comprising a core box having a core projected therefrom, an annular groove at the base of said core, and a trimming ring having a cutting edge adapted to enter said groove, said ring being rotatable and having a plurality of stripping devices for engagement with the baked article at the base of the core, said stripping devices being movable toward and from the axis of turning of the ring.

25. A baking machine comprising a core box having a core projected therefrom, and a rotary ring having a plurality of stripping devices movable toward and from the axis of the ring to cooperate with the baked article on the core at the base of the latter.

26. The combination with a core box and a head movable relatively one to the other, of a core projected from the core box, and a stripping and trimming ring axially and rotatably mounted on the head and adapted to cooperate with the core box at the base of the core to effect such rotary and axial movement.

27. The combination with a core box and a head movable relatively one to the other, of a core projected from the core box, and a stripping and trimming ring axially and rotatably mounted on the head and adapted to cooperate with the core box at the base of the core to effect such rotary and axial movement, said stripping and trimming ring carrying a plurality of stripping devices movable toward the axis of the ring on the axial movement of the latter.

28. In a baking machine, the combination with a core box and a head movable relatively one to the other, said head having a circular opening and the core box having a core adapted to extend through said opening, of a ring mounted to turn and to move axially in the opening in the head with the engagement of the core box at the base of the core, spring arms secured in said ring and having stripping devices at their ends adapted to be moved inwardly during the cooperation of the arms with the wall of the opening of the head upon the axial movement of the stripping ring.

29. In a baking machine, the combination with a core box and a head one of which is movable relatively to the other, the core box being provided with a core and with an annular groove at the base of the core and the head having a cylindrical opening, of a ring mounted in said cylindrical opening of the head and having an edge adapted to enter the annular groove in the core box, said ring engaging the head to effect the axial and turning movement of the ring, and stripping devices carried by the ring and moving toward the center of the latter upon such axial movement.

30. In a baking machine, the combination with a core box and a head having relative movement between them, the core box being provided with a core and the head having an opening through which the core projects, of a ring mounted in said opening, a pin and slot connection between the head and the ring, the slot being so arranged that when the ring engages the core box at the base of the core the ring will move axially and rotatably in the head, and stripping devices carried by said ring.

31. The combination with a core box and a core projecting therefrom, of a ring through which the core is adapted to be projected, and a brushing device on said ring for cooperating with the core box at the base of the core.

32. The combination with a core box having an annular series of mold elements, of brushing means for the mold elements arranged in an annular series and each having a gear connected thereto, and a gear arranged centrally of said first mentioned gear and meshing with said first mentioned gear to drive the latter in order to turn said brushes.

33. In combination with a mold, a centering device arranged to enter the mold, and brushes arranged about the centering device to cooperate with the edge of the mold.

34. The combination with a core box having an annular series of projecting cores, of brushing means for removing particles from the core box at the base of the core comprising a plurality of rings through which the cores are adapted to be projected, brushes carried by said rings for cooperating with the core box at the bases of the cores, and a gear meshing with all of said rings to turn the latter.

GEORGE GALBRAITH.